United States Patent [19]

Hashimoto et al.

[11] 3,982,025
[45] Sept. 21, 1976

[54] SOY CHEESE SPREAD AND PROCESS FOR PREPARING SAME

[75] Inventors: Yukio Hashimoto, Izumiotsu; Fumiyuki Sunada, Osaka, both of Japan

[73] Assignee: Fuji Oil Company, Ltd., Osaka, Japan

[22] Filed: Dec. 9, 1974

[21] Appl. No.: 530,850

[30] Foreign Application Priority Data

Dec. 11, 1973  Japan............................. 48-139191

[52] U.S. Cl. .................................. 426/46; 426/52; 426/602; 426/634
[51] Int. Cl.² ........................................ A23L 1/20
[58] Field of Search ............... 426/46, 52, 372, 373, 426/49, 602, 634

[56] References Cited
UNITED STATES PATENTS

| | | |
|---|---|---|
| 3,364,034 | 1/1968 | Hoersch et al.................... 426/46 X |
| 3,433,643 | 3/1969 | Tatter et al. ...................... 426/46 X |
| 3,857,970 | 12/1974 | Tsumura et al...................... 426/46 |

FOREIGN PATENTS OR APPLICATIONS

| | | |
|---|---|---|
| 465,025 | 3/1968 | Japan.................................. 426/52 |
| 11,973 | 6/1972 | Japan |
| 1,284,331 | 8/1972 | United Kingdom |

Primary Examiner—A. Louis Monacell
Assistant Examiner—Esther L. Massung

[57] ABSTRACT

A soy cheese spread having excellent spreadability, oral melting and flavor characteristics is made by admixing a soy cheese, prepared by fermenting soy milk with a lactic acid-forming cheese starter culture to form a curd, with an edible oil or fat, a cheese emulsifying melting salt, and water and then vigorously agitating this mixture at an elevated temperature to liquefy and homogeneously emulsify the ingredients thereof and thereby form a product having a paste-like consistency.

8 Claims, No Drawings

SOY CHEESE SPREAD AND PROCESS FOR PREPARING SAME

BACKGROUND OF THE INVENTION

This invention relates to a soy cheese spread and a process for making same.

Because of a recent expansion in the use of cheese spreaded bread as a meal or a main meal supplement into countries where such a food has not been customarily used (particularly the Asian countries), the need for such spreadable products has increased accordingly. Most spreadable cheese products are made with dairy products derived from mammalian milk (primarily cow milk). Needless to say, such dairy products are presently in short supply in many of these countries and future supply will even become less because of the limited land area available for raising dairy animals and feeds therefor, particularly in view of the rapidly expanding population. It is well known that soybeans have a very high protein content and represent a much more productive source of protein than dairy animals. Therefore, considerable effort has been directed toward making an acceptable spreadable cheese-like product using soybean derived products as a primary raw material.

Examples of prior art attempts to produce such a spreadable product are disclosed by S. J. Circle and D. W. Johnson, "Edible Isolated Soybean Protein and Processed Plant Protein Foodstuffs," Academic Press, New York (1958) and in Japanese Patent Open Publication No. 11,973/1972. In the process described in the former publication, a spreadable, creamy cheesylike product is made by blending a soy proteinate (an alkali metal salt of soy protein), a hydrogenated vegetable oil, water and salt. Since this soy cheese product is not fermented, it does not have particularly acceptable spreading and oral melting properties and lacks flavor taste characteristics normally associated with cheese spreads made from dairy products.

In the process described in the latter publication, a sauce or dressing-like cheesy product is prepared by blending a blue cheese produced by fermenting a soy protein curd from a soy milk, containing butter fat and powdered skim milk, with an inoculum of *Penicillium roguefortii* and aging the curd with another kind of dairy cheese. Thus, this product requires dairy ingredients to provide spreadability.

To the best of our knowledge, a soy cheese spread not containing dairy product ingredients and having acceptable spreadability, oral melting and flavor characteristics heretofore has not been available. The difficulty in successfully producing an acceptable spread from soybeans at least is partially due to the peculiar characteristics of soy globulin which has a much higher water binding capacity (water-holding property) than casein and tends to gel upon being heated, resulting in poor spreadability and oral melting properties in the processed products produced therefrom. Products made from soybeans also tend to have an undesirable beany taste. Furthermore, the texture of spreads made from soybean sources usually have a grainy texture in comparison to the smooth, uniform texture normally associated with spreads made from dairy cheeses.

SUMMARY OF THE INVENTION

The principal object of the invention is to provide a soy cheese spread having improved spreadability, oral melting and flavor characteristics.

Another principal object of the invention is to provide a simple method for preparing such a soy cheese spread without using dairy product ingredients.

Other objects, aspects and advantages of the invention will become apparent upon reviewing the following detailed description and the appended claims.

According to the invention, a soy cheese is used as the starting material and is admixed with an edible oil or fat, a conventional cheese emulsifying melting fat, and water. The resultant mixture is vigorously agitated at an elevated temperature to melt or liquefy and homogeneously emulsify the ingredients of the mixture and form a paste-like product having excellent spreadability, oral melting and taste characteristics.

DESCRIPTION OF THE PREFERRED EMBODIMENTS

Instead of using soybean or defatted soybeans as the raw material, soy cheese is used as the starting material in the process of the invention. Use of a soy cheese as the starting material minimizes the necessity for deodorizing since this is usually accomplished during the preparation of the soy cheese. Also, it has been found that a product having a smooth grain and texture can be prepared by using soy cheese as a starting material. Furthermore, the use of soy cheese facilitates control of the aging in the product as compared to using soybeans or defatted soybeans as a starting raw material. Use of an aged soy cheese improves the flavor of the product. Also, the soy globulin is enzymatically degraded during aging of the soy cheese causing a weakening of the gelling force of the soy globulin upon being heated. Thus, the normal tendency of soy globulin to gel during heating and the resultant worsening of the spreadability and oral melting of the resultant product is minimized. In accordance with one aspect of the invention, the gelling force of soy globulin is further decreased by adding a proteolytic enzyme (protease) which accelerates the enzymatic degradation of the soy globulin.

The soy cheese used as part of the starting mixture is a conventional natural soy cheese prepared from soy milk with the aid of a lactic acid-forming cheese starter culture. For example, a suitable soy cheese can be prepared by admixing a small amount of an edible animal and/or vegetable fat or oil with defatted soy milk, and adding a conventional lactic acid-forming cheese starter culture, such as *Streptococcus thermophilus*, and a coagulant, such as a non-toxic water soluble alkaline earth metal (e.g., calcium sulfate, calcium chloride or magnesium chloride) or an uronic acid lactone (e.g., D-glucono-δ-lactone), to this mixture to form a curd. The curd is then cut, cooked, drained and aged in the usual manner for making a dairy cheese.

A soy cheese particularly adaptable for use in the process of the invention is prepared in accordance with the process described in Japanese Patent Open Publication No. 471/1974 wherein an acid precipitated soy protein is coagulated with a lactic acid-forming cheese starter culture and D-glucono-δ-lactone to form a curd.

As the starter of the lactic fermentation for making the soy cheese, and inoculum of a lactic acid-producing bacteria formed from carbohydrates, such as *Strepto-

*coccus thermophilus, Streptococcus faecalis, Streptococcus diacetilactis, Streptococcus lactis, Streptococcus cremoris, Lactobacillus helveticus, Lactobacillus bulgaricus, Lactobacillus casei,* and *Leuconostoc citrovorum,* are preferred. As mentioned above, a proteolytic enzyme preferably is added to the soy cheese curd to accelerate the enzymatic degradation of soy globulin and thereby further inhibit the gelling tendency thereof during heating. Papain is a representative example of a suitable proteolytic enzyme.

The proteolytic enzyme can be added to the soy milk prior to the initiation of the fermentation or admixed with the soy cheese curd after cooking.

The inclusion of an edible oil or fat as part of the starting mixture, along with the soy cheese, a melting salt and water, improves the spreadability and oral melting characteristics of the final product. Although various animal and/or vegetable fats or oils can be used, it is preferred that such an oil or fat have melting point approximating or lower than human body temperature. Representative examples of suitable oils and fats include semi-solid vegetable oils, such as palm oil, palm kernel oil, and coconut oil; animal fats, such as beef tallow and lard; fractioned oils or fats, such as high melting fractions of palm oil, palm kernel oil, coconut oil, soybean oil, cotton seed oil and sunflower oil; hardened vegetable oils, such as hardened soybean oil and rape seed oil, and synthetic oils or fats produced by interesterifying a plurality of glycerides with an alkaline catalyst whereby one or more short chain fatty acid compounds, such as butyroyl, caproyl or caprinoyl radicals, are randomly introduced into the original glyceride structure.

The amount of edible oil or fat used in the starting mixture is about 45 to about 60 weight % based on the total weight of the dry solids in the soy cheese. If the oil or fat content is less than about 45 weight %, the final product does not exhibit the desired spreadability or oral melting. On the other hand, if the content is greater than about 60 weight %, the product has an unfavorable oily odor.

The melting salts used in the starting mixture can be any of the so-called cheese emulsifying agents used in preparing processed dairy cheese. Representative examples of suitable melting salts include sodium phosphates, such as disodium phosphate and trisodium phosphate; sodium pyrophosphates, such as sodium acid pyrophosphate, tetrasodium pyrophosphate; sodium polyphosphates; sodium metaphosphates, such as sodium hexametaphosphate; sodium citrate; sodium tartrate; dipotassium phosphate; potassium citrate; calcium citrate; sodium potassium tartrate and mixtures thereof, with sodium phosphates being preferred.

The amount of melting salt used in the starting mixture preferably is about 1 to about 4 weight % based on the total weight of the soy cheese.

Inclusion of substantial quantities of water in the final product is important to provide it with the desired uniform, spreadability and oral melting. The amount of water used in the starting mixture is sufficient to provide a content thereof in the final product within the range of about 50 to about 75 weight %, based on the total weight of the final product. If the water content is much less than this minimum level, the final product will not have the desired spreadability because of a tendency for soy globulin of the soy cheese to gel during the subsequent heat-agitation step. On the other hand, a water content in excess of this maximum level produces a final product having uneven spreadability characteristics.

In order to improve the grain, a gum substance such as those used in making processed dairy cheese spreads can be included in the starting mixture. Representative examples of suitable gum substances include guar gum, gum acacia, xelose, tragacanta, pluran, sodium alginate and the like. A spreadable product having acceptable grain characteristics can be produced by the process of the invention without including a gum substance in the starting mixture. Therefore, the use of a gum substance is not essential and is included only when a product having a very fine grain is desired.

A natural soy cheese ordinarily has a yellowish white color. In order to provide the final product with a yellow color resembling dairy cheese spread, an appropriate amount of a suitable coloring additive, preferably derived from natural products such as carotenes, can be included in the starting mixture if desired. Also, various conventional flavoring and seasoning ingredients used in usual cheese making processes, such as sodium glutamate, nucleic acids and the like, can be included in the starting mixture or admixed with a product after the heat-agitation step.

The various ingredients of the starting mixture, soy cheese, an edible oil or fat, a melting salt and water, and a gum substance and other of the above-mentioned additives (when used), are admixed homogeneously and this mixture is then vigorously agitated, preferably under a positive pressure, at an elevated temperature to liquefy the ingredients thereof and form a paste-like product. That is, the starting mixture is agitated at an elevated temperature with sufficient mechanical shearing forces to liquefy the soy cheese and other ingredients and form a homogeneous emulsion without gelling soy globulin contained in the soy cheese. If the starting mixture is merely stirred or mildly agitated, such as with a conventional homogenizing device, at elevated temperatures sufficient to liquefy and homogenize the soy cheese and the other ingredients, the soy globulin tends to gel and a product having unacceptable spreadability is produced. Therefore, it is important that the mixture be vigorously agitated under temperature and pressure conditions whereby a homogeneous emulsion of the starting ingredients in a liquefied state is produced.

The degree of agitation required depends to a large extent upon the ripeness or maturity of the soy cheese used in the starting mixture, with higher agitation being required for less ripened or unmatured soy cheese. Generally, when a Stephantype agitator is used, an agitation time of about 50 to 100 minutes at a temperature of about 80° is sufficient to provide the desired degree of liquefication and homogenization of the starting mixture ingredients. In order to permit defoaming and deodorizing, the homogenate preferably is allowed to stand at ambient or less than ambient pressure for at least 10 minutes while being maintained at a temperature of about 80° C. The homogenate is introduced into a container in the usual manner and cooled to provide a spreadable product having a paste-like consistency. A particularly useful spreadable product containing about 10 to about 20 weight % soy protein, about 10 to 20 weight % oil or fat and about 60 to about 75% water and having excellent spreadability, oral melting, and flavor characteristics can be produced by the process of the invention.

Without further elaboration, it is believed that one skilled in the art can, using the preceding description, utilize the present invention to its fullest extent. The following preferred examples are presented for the purpose of illustrating the invention and are not to be considered to be limitations thereof.

EXAMPLE 1

10 kg of soy milk extracted from defatted soybeans and having a soy protein content of 3.7 weight % was sterilized by heating to 90° C for 20 minutes and then allowed to cool to room temperature. The sterilized soy milk was mixed with 325 g of a hardened soybean oil having a melting point of 32° C and 50 g of lactose to form an emulsion. The emulsion was inoculated with 300 g of a lactic acid forming cheese starter culture derived from Streptococcus thermophelus and maintained at a temperature of 50°–52° C until the acidity thereof reached 0.20. 25 g of D-glucono-δ-lactone (a coagulant) was added to the resulting broth and the broth was maintained at 50°–52° C until a curd was formed. The curd was cut and cooked at 55° C. After draining and light pressing to remove whey, the curd was salted with 30 grams of salt, molded pressed at 17° C for 15 hours and aged for about 2 months to produce approximately 1600 grams of a natural soy cheese. 238 mixture 1300 grams of this soy cheese were admixed with a melting salt (Polyphosphate Takeda 4B, a mixture of polyphosphates supplied by Takeda Pharmaceutical Industries Co., Ltd., Osaka, Japan), 3 g of a dairy cheese flavoring additive (cheese flavor FS-1268 supplied by Hasegawa Co., Ltd., Tokyo, Japan), 65 mg of a cheese seasoning (Ribotide, a seasoning made from nucleic acid and supplied by Takeda Pharmaceutical Industries Co., Ltd.), 3 g of salt, 9 mg of β-carotene, 250 g of a hardened soybean oil having a melting point of 30° C of 1000 cc of water. This mixture was mechanically agitated at 80° C and for about 80 minutes in a Stephan UMTA 15 agitator operating at 1500 r.p.m. to melt or liquefy and homogenize the ingredients thereof and form a paste-like spreadable product containing 11 wt. % soy protein, 19 wt. % soybean oil, 65 wt. % water and 6 wt. % of the remaining ingredients. This product exhibited excellent spreadability and readily melted in the mouth when eaten.

EXAMPLE 2

In another test, the same soy cheese and other ingredients used in Example 1 were agitated in a low speed cheese fusing vessel used for making processed dairy products (supplied by Tanaka Food Machinery Co., Lt. Osaka, Japan) and operated at 100 r.p.m. The product has a generally pastelike consistency but did not have the homogenity of the product produced in Example 1 and had a rough, grainy texture. This product was modified to have a homogeneous appearance by passing through kneading rollers but the spreadability and melting characteristics of the resultant product were still substantially inferior to those of the product produced in Example 1.

EXAMPLE 3

Separate 1600g aliquots of soy cheese curd prepared in Example 1 were aged for 4 days. One sample (A) was aged without the addition of a proteolytic enzyme and 8 g of papain were added to the other sample (B) during the salting step. Both soy cheese samples were processed in the same manner described in Example 1 to produce a spreadable product. The product produced from sample (A) was not homogeneous and had poor spreadability. On the other hand, the product produced from sample (B) had a homogeneous, paste-like consistency and exhibited excellent spreadability, oral melting and flavor characteristics.

From the foregoing description, one skilled in the art can easily ascertain the essential characteristics of the invention, without departing from the spirit and scope thereof, can make various changes and modifications to adapt the invention to various uses and conditions.

We claim:

1. A method for making a spreadable soy cheese product without using dairy product ingredients comprising
   admixing an aged soy cheese, prepared by fermenting a soy milk with a lactic acid-forming cheese starter culture to form a curd, cooking said curd, and aging said cooked curd, with about 45 to 60 weight % of an edible oil or fat, based on the weight of the dry solids in said soy cheese, a cheese emulsifying melting salt and a sufficient quantity of water to provide a content thereof in said product of about 50 to about 75 weight %, based on the total weight of said product; and
   vigorously agitating the resulting mixture at an elevated temperature with sufficient mechanical shearing force to form the ingredients thereof into a liquefied, homogeneous emulsion, without causing gellation of soy globulin contained in said soy cheese, thereby forming a spreadable soy cheese product having a paste-like consistency.

2. A method according to claim 1 including further admixing a gum substance with said soy cheese.

3. A method according to claim 1 wherein said agitating step is carried out at a temperature of about 80° C.

4. A method according to claim 3 wherein the homogenate formed during said agitating step is maintained at a temperature of about 80° C and at ambient or less than ambient pressure for at least 10 minutes after said agitating step.

5. A method according to claim 1 including
   adding a proteolytic enzyme either to said soy milk prior to the initiation of fermentation or to said cooked curd to accelerate enzymatic degradation of soy globulin contained in said soy cheese during aging.

6. A spreadable soy cheese product produced by the method of claim 1.

7. A method according to claim 1 wherein said cheese emulsifying melting salt is selected from the group consisting of sodium phosphates, sodium pyrophosphates, sodium polyphosphates, sodium metaphosphates, sodium citrate, sodium tartrate, dipotassium phosphate, potassium citrate, calcium citrate, sodium potassium tartrate and mixtures thereof.

8. A method according to claim 7 wherein the amount of said cheese emulsifying melting salt is within the range of about 1 to about 4 weight %, based on the total weight of said soy cheese.

* * * * *